United States Patent [19]

Morita

[11] Patent Number: 5,310,843
[45] Date of Patent: May 10, 1994

[54] ORGANOPOLYSILOXANE AND METHOD FOR THE PREPARATION THEREOF

[75] Inventor: Yoshitsugu Morita, Chiba, Japan

[73] Assignee: Dow Corning Toray Silicone Co., Ltd., Tokyo, Japan

[21] Appl. No.: 953,436

[22] Filed: Sep. 29, 1992

[30] Foreign Application Priority Data

Oct. 17, 1991 [JP] Japan .................................. 3-298315

[51] Int. Cl.$^5$ ............................................ C08G 77/08
[52] U.S. Cl. ........................................ 528/15; 528/32; 528/27; 528/31; 528/32; 525/478; 556/455; 556/462; 549/215
[58] Field of Search ................... 528/15, 27, 31, 34, 528/32; 525/478; 556/455, 462; 549/215

[56] References Cited

U.S. PATENT DOCUMENTS

| | | | |
|---|---|---|---|
| 3,455,877 | 7/1969 | Plueddemann | 260/465 |
| 4,083,856 | 4/1978 | Mendicino | 528/27 |
| 4,370,358 | 1/1983 | Hayes et al. | 427/54.1 |
| 4,707,531 | 11/1987 | Shirahata | 528/12 |
| 4,946,921 | 8/1990 | Shirahata et al. | 528/39 |
| 5,011,901 | 4/1991 | Fukutani | 528/42 |
| 5,079,311 | 1/1992 | Colas | 525/478 |
| 5,158,991 | 10/1992 | Riding | 522/170 |

FOREIGN PATENT DOCUMENTS 0458355 5/1991 European Pat. Off. .
0116099 9/1979 Japan .

OTHER PUBLICATIONS

A. Crespy et al. "Synthesis of Macromolecular Coupling Agents and Binders", pp. 2061–2067, J. of Applied Polymer Science, vol. 44, 1992.

J. Crivello et al., J. of Polymer Science, vol. 28, 479–503, 1990 "The Synthesis, Characterization, & Photoinitiated Cationic Polymerization of Silicon-Containing Epoxy Resins".

Y. Chujo et al., Polymer Journal, vol. 16, No. 6, pp. 495–504 (1984) "Synthesis & Application of Polymerizable Silicone Oligomers From Water Glass".

Primary Examiner—Melvyn I. Marquis
Assistant Examiner—Margaret W. Glass
Attorney, Agent, or Firm—Roger H. Borrousch

[57] ABSTRACT

An MQ organopolysiloxane compatible with organic plastics, has an epoxy-containing organic group, and has the following general formula $$(R^2-\underset{\underset{R^1}{|}}{\overset{\overset{R^1}{|}}{Si}}O_{1/2})_a(R^3-\underset{\underset{R^1}{|}}{\overset{\overset{R^1}{|}}{Si}}O_{1/2})_b(SiO_{4/2})_c$$

$R^1$ represents monovalent hydrocarbon groups, $R^2$ represents the hydrogen atom and monovalent hydrocarbon groups, $R^3$ represents epoxy-containing organic groups and alkoxysilylalkyl groups; a is 0 or a positive number, b and c are positive numbers, a/c has a value of 0 to 4, b/c has a value of 0.05 to 4, and (a+b)/c has a value of 0.2 to 4. Also, a method for the preparation of this organopolysiloxane comprises an addition reaction of an Si-H containing organopolysiloxane with an epoxy-containing compound in the presence of a hydrosilylation catalyst.

7 Claims, 2 Drawing Sheets

ORGANOPOLYSILOXANE AND METHOD FOR THE PREPARATION THEREOF

BACKGROUND OF THE INVENTION

1. Technical Field

The present invention relates to an organopolysiloxane and to a method for its preparation. More specifically, the present invention relates to an organopolysiloxane comprising monofunctional siloxane units (M unit) and tetrafunctional siloxane units (Q unit) and that also has an epoxy-containing organic group.

2. Prior Art

Various types of MQ organopolysiloxanes are already known in the art. Shirahata in U.S. Pat. No. 4,707,531, issued Nov. 17, 1992, describes a method of making MQ organopolysiloxanes which have long been used as starting materials for varnishes and pressure-sensitive adhesives. According to Shirahata an alkyl silicate is dripped into a mixture of an aqueous hydrochloric acid which contains at least 5 weight percent hydrogen chloride and a trialkylailane or a disiloxine at a temperature of 0° to 90° C.

Shirahata and Fukutani in U.S. Pat. No. 4,946,921, issued Aug. 7, 1990, describe a hydroxyphenyl-containing MQ organopolysiloxane of the general formula

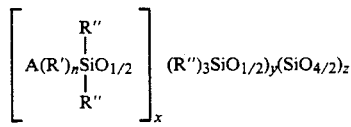

where A is a hydroxyphenyl group, R′ is an alkylene group having 1 to 4 carbon atoms, n is zero or one, R″ is an alkyl group having 1 to 4 carbon atoms, x and z are positive numbers, y is zero or a positive number, x, y, and z have values such that their ratios are $0 < (x+y)/z < 4$, and $zero < y/x < 5$.

Fukutani in U.S. Pat. No. 5,011,901, issued Apr. 30, 1991, describes a chloromethyl-containing MQ organopolysiloxane of the general formula

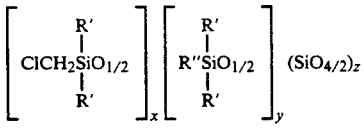

where R′ is a monovalent hydrocarbon group having 1 to 6 carbon atoms, R″ is a hydrogen atom or a monovalent hydrocarbon group having 1 to 6 carbon atoms, x and z are positive numbers, y is zero or a positive number, and x, y, and z have values such that their ratios are $0.3 < (x+y)/z < 4$ and $zero < y/x < 100$.

However, the groups that may be bonded to the silicon atom in the monofunctional siloxane units (M unit) in the above-referenced MQ organopolysiloxanes are limited to the hydrogen atom, alkyl groups, alkenyl groups, the hydroxyphenyl group, and the chloromethyl group. There have been no reports to date of MQ organopolysiloxane in which the silicon atom of the monofunctional siloxane unit (M unit) carries an epoxy-containing organic group.

The present inventor achieved the present invention as the result of extensive efforts directed at solving the aforementioned problem.

SUMMARY OF THE INVENTION

The present invention takes as its object the introduction of organopolysiloxane having monofunctional siloxane units (M unit) and tetrafunctional siloxane units (Q unit) and which also has an epoxy-containing organic group. A further object of the present invention is the introduction of a method for the preparation of this organopolysiloxane.

This invention relates to a composition comprising an organopolysiloxane having an epoxy-containing organic group wherein said organopolysiloxane is represented by the following general formula

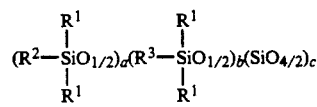

$R^1$ is a non-alkenyl monovalent hydrocarbon group, each $R^2$ is independently selected from a hydrogen atom or a non-alkenyl monovalent hydrocarbon group, each $R^3$ is independently selected from an epoxy-containing organic group or an alkoxysilylalkyl group, a is 0 or a positive number, b and c are positive numbers, a/c has a value of 0 to 4, b/c has a value of 0.05 to 4, and $(a+b)/c$ has a value of 0.2 to 4.

This invention also relates to a method for producing an organopolysiloxane having an epoxy-containing organic group comprising reacting in the presence of (A) a hydrosilylation-reaction catalyst, with (B) an SiH-containing organopolysiloxane with the general formula

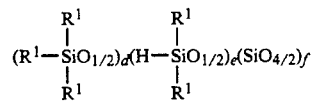

$R^1$ is a non-alkenyl monovalent hydrocarbon group, d is 0 or a positive number, e and f are positive numbers, d/f has a value of 0 to 4, e/f has a value of 0.05 to 4, and $(d+e)/f$ has a value of 0.2 to 4, (C) an aliphatically unsaturated epoxy-containing organic compound, and optionally (D) an alkoxysilylalkene.

DESCRIPTION OF THE PREFERRED EMBODIMENTS

Figure 1:
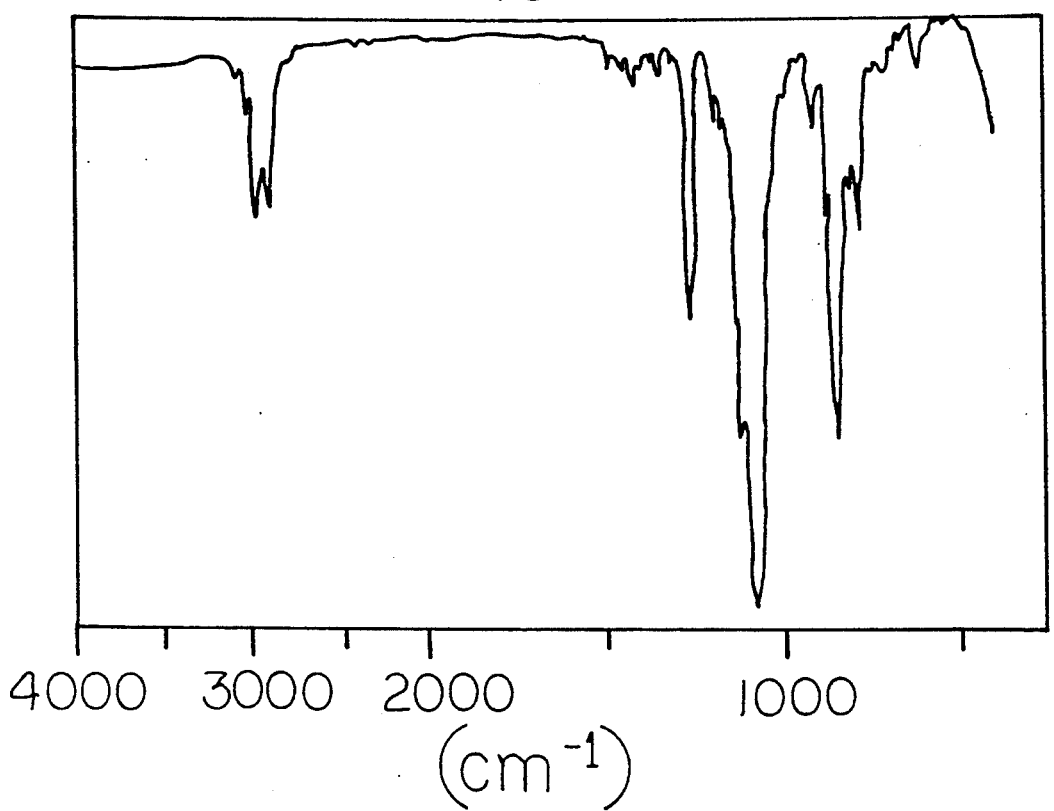
FIG. 1 contains an infrared spectrogram for the organopolysiloxane produced in Example 1.
Figure 2:
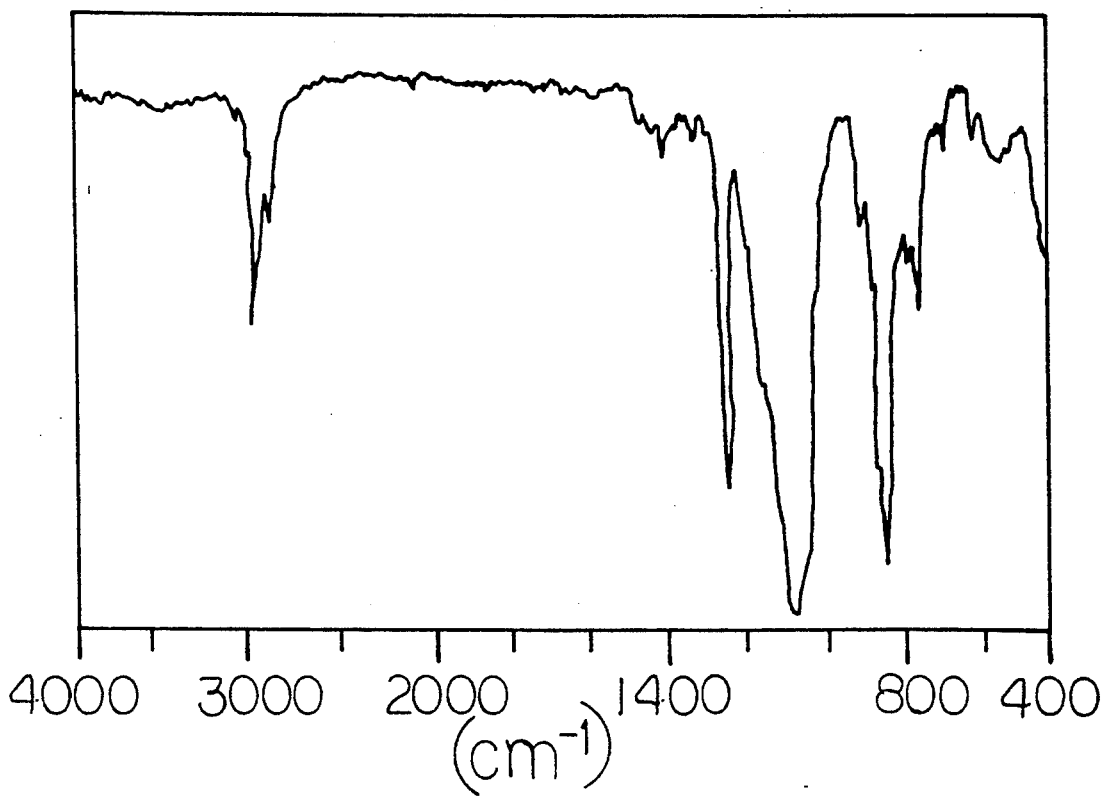
FIG. 2 contains an infrared spectrogram for the organopolysiloxane produced in Example 2.
Figure 3:
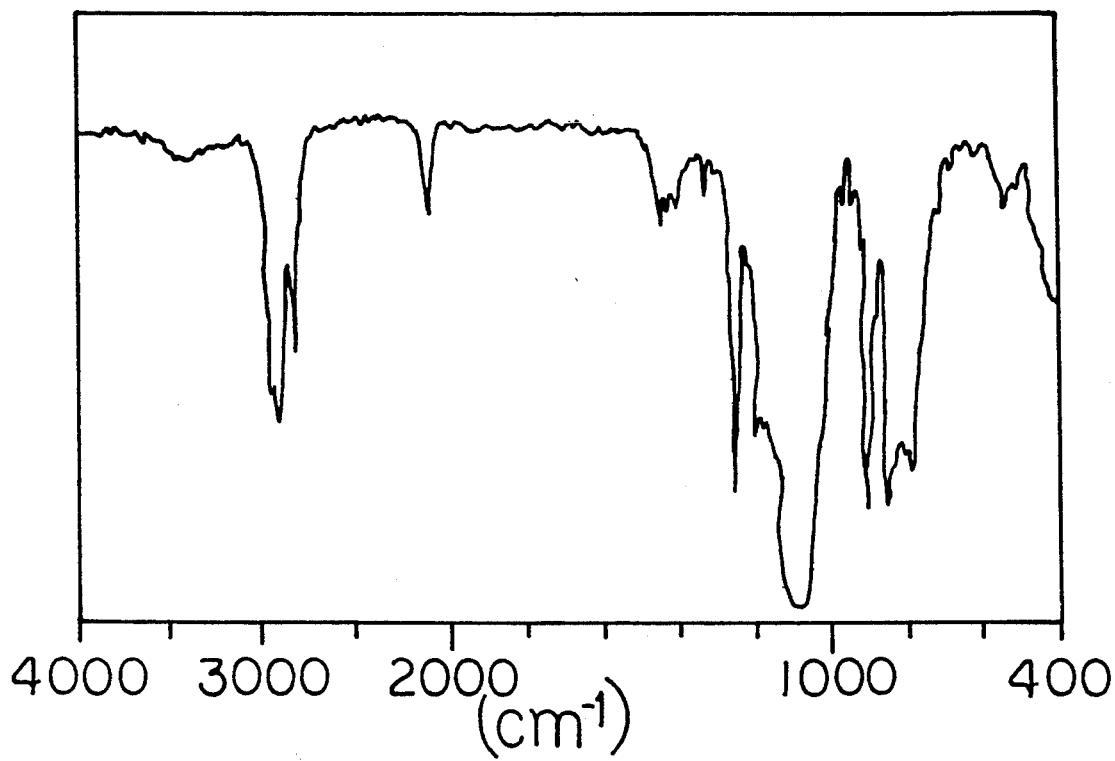
FIG. 3 contains an infrared spectrogram for the organopolysiloxane produced in Example 3.
Figure 4:
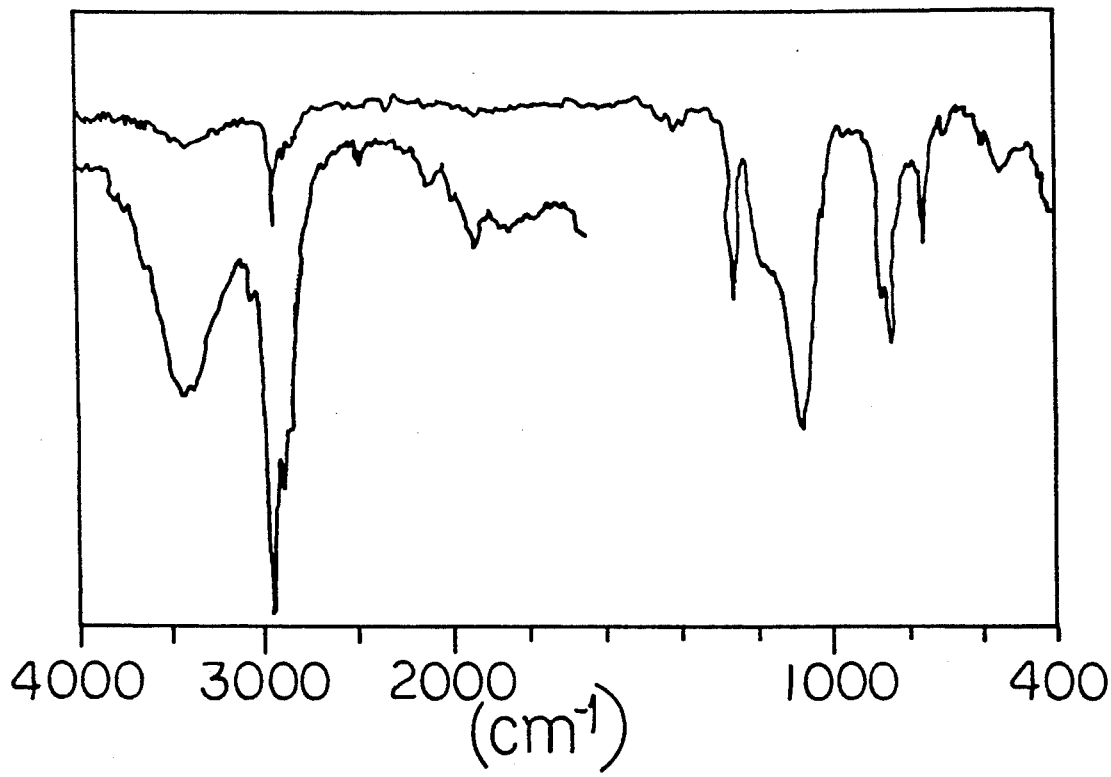
FIG. 4 contains an infrared spectrogram for the organopolysiloxane produced in Example 4.

The MQ organopolysiloxane according to the present invention contains at least 1 epoxy-containing organic group in each molecule and is represented by the following general formula

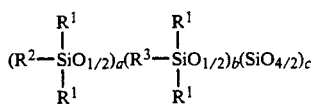

$R^1$ in this formula represents non-alkenyl monovalent hydrocarbon groups, and it is specifically exemplified by alkyl groups such as methyl, ethyl, propyl, and butyl; aryl groups such as phenyl and tolyl; aralkyl groups such as benzyl and phenylethyl; and haloalkyl groups such as chloromethyl and 3,3,3-trifluoropropyl. $R^2$ represents the hydrogen atom and non-alkenyl monovalent hydrocarbon groups, and it is specifically exemplified by the hydrogen atom and by alkyl groups such as methyl, ethyl, propyl, and butyl; aryl groups such as phenyl and tolyl; aralkyl groups such as benzyl and phenylethyl; and haloalkyl groups such as chloromethyl and 3,3,3-trifluoropropyl. $R^3$ represents epoxy-containing organic groups and alkoxysilylalkyl groups. The epoxy-containing organic groups are specifically exemplified by glycidoxyethyl, glycidoxypropyl, glycidoxybutyl, 3,4-epoxycyclohexylethyl, 3,4-epoxycyclohexylpropyl, 3,4-epoxynorbornanylethyl, and 2-(3,4-epoxy-3-methylcyclohexyl)-2-methylethyl, and the alkoxysilylalkyl groups are specifically exemplified by trimethoxysilylethyl, triethoxysilylethyl, and methyldimethoxysilylethyl. The subscript a represents the number of monofunctional siloxane units (M unit) that lack epoxy-containing organic groups, and it may be 0 or a positive number. The subscript b is a positive number that represents the number of monofunctional siloxane units (M unit) that contain epoxy-containing organic groups or organosilylalkyl groups. The subscript c is a positive number that represents the number of tetrafunctional siloxane units (Q unit). According to this invention the following ratios for these subscripts are $a/c = 0$ to 4, $b/c = 0.05$ to 4, and $(a+b)/c = 0.2$ to 4. The bases for these ratios are as follows: more than 4 monofunctional siloxane units (M unit) cannot be present per tetrafunctional siloxane unit (Q unit), and at least 0.05 monofunctional siloxane units (M unit) having an epoxy-containing organic group or alkoxysilylalkyl group must be present per tetrafunctional siloxane unit (Q unit) in order for the organopolysiloxane according to the present invention to be highly compatible with organic resins.

The MQ organopolysiloxane according to the present invention is liquid or solid at room temperature. While its molecular weight is not specifically restricted, the molecular weight preferably falls into the range of 500 to 500,000 in order to obtain good miscibility with organic resins.

The hydrosilylation-reaction catalyst (also known as addition reaction) comprising component (A) is a catalyst for the addition reaction between the silicon-bonded hydrogens in component (B) and the aliphatically unsaturated bonds in components (C) and (D). The hydrosilylation-reaction catalyst of component (A) is not specifically restricted as long as it is a compound that may ordinarily be employed as a hydrosilylation-reaction catalyst. It is specifically exemplified by platinum compounds, rhodium compounds, and palladium compounds. Platinum compounds are particularly preferred. Said platinum compounds are specifically exemplified by chloroplatinic acid, alcohol solutions of chloroplatinic acid, the complexes of platinum and aliphatically unsaturated hydrocarbon compounds, platinum/divinyldisiloxane complexes, platinum black, and platinum/active carbon. Component (A) should be added in a catalytic quantity. Its quantity of addition is not specifically restricted; however, for the example of a platinum compound as component (A), the preferred addition is 0.01 to 500 ppm as platinum metal atoms in component (A) based on the organopolysiloxane comprising component (B).

The SiH-containing organopolysiloxane comprising component (B) is the main starting material in the present invention, and it is represented by the following general formula

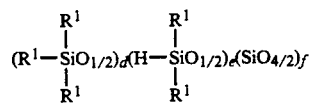

$R^1$ in the preceding formula represents non-alkenyl monovalent hydrocarbon groups, and it is specifically exemplified by alkyl groups such as methyl, ethyl, propyl, and butyl; aryl groups such as phenyl and tolyl; aralkyl groups such as benzyl and phenylethyl; and haloalkyl groups such as chloromethyl and 3,3,3-trifluoropropyl. The subscript d represents the number of SiH-free monofunctional siloxane units (M unit), and it is 0 or a positive number. The subscript e is a positive number that represents the number of SiH-containing monofunctional siloxane units (M unit), and f is a positive number that represents the number of tetrafunctional siloxane units (Q unit). The following ratios obtain for these subscripts: $d/f = 0$ to 4, $e/f = 0.05$ to 4, and $(d+e)/f = 0.2$ to 4. The bases for these ratios are as follows: more than 4 monofunctional siloxane units (M unit) cannot be present per tetrafunctional siloxane unit (Q unit), and at least 0.05 SiH-containing monofunctional siloxane units (M unit) must be present per tetrafunctional siloxane unit (Q unit) in order for the organopolysiloxane according to the present invention (organopolysiloxane after introduction of epoxy-containing organic groups or alkoxysilylalkyl) to be highly compatible with organic resins.

Component (B) itself can be produced by methods which are known. Methods for the preparation of component (B) are specifically exemplified, inter alia, as follows: cohydrolysis of tetrahalosilane and monohalosilane, cohydrolysis of tetraalkoxysilane and monoalkoxysilane, cohydrolysis of totraalkoxysilane and tetraorganodisiloxane followed by a reequilibration polymerization reaction. In a preferred method, tetraalkoxysilane is dripped into a stirred aqueous hydrochloric acid solution of organosilicon compound selected from hexaorganodisiloxane, tetraorganodisiloxane, triorganohalosilane, and diorganohalosilane as described by Shirahata are hereby incorporated by reference. Shirahata shows a method of preparing these MQ organopolysiloxanes having Si—H.

The epoxy-containing aliphatically unsaturated organic compound of component (C) is the component that introduces the epoxy-containing organic group into the organopolysiloxane according to the present invention. Component (C) is specifically exemplified by vinyl glycidyl ether, allyl glycidyl ether, butenyl glycidyl ether, 1,2-epoxy-4-allylcyclosiloxane, 1,2-epoxy-4-vinylcyclohexane, 2,3-epoxy-5-vinylnorbornane, and 1,2-epoxy-1-methyl-4-isopropylcyclohexane.

The quantity of addition of component (C) is not specifically restricted in the preparative method according to the present invention. However, when less than 1 aliphatically unsaturated bond from component (C) is present per silicon-bonded hydrogen in component (B), the organopolysiloxane product according to the present invention will be organopolysiloxane that contains both silicon-bonded hydrogen and epoxy-containing organic groups. On the other hand, when 1 or more aliphatically unsaturated bond from component (C) is present per silicon-bonded hydrogen in component (B), organopolysiloxane carrying the epoxy-containing organic group is produced that is almost free of silicon-bonded hydrogen.

The alkoxysilylalkene component (D) is the component that introduces the alkoxysilylalkyl group into the organopolysiloxane according to the present invention. Component (D) is specifically exemplified by trimethoxyvinylsilane, methyldimethoxyvinylsilane, dimethylmethoxyvinylsilane, triethoxyvinylsilane, methyldiethoxyvinylsilane, and trimethoxyallylsilane.

The addition of component (D) in the preparative method according to the present invention is optional. Component (D) is reacted together with component (C) when the alkoxysilylalkyl group must be introduced into organopolysiloxane according to the present invention. When component (D) is used in the preparative method according to the present invention, the organopolysiloxane product according to the present invention will contain silicon-bonded hydrogen plus the epoxy-containing organic group plus alkoxysilylalkyl when less than 1 aliphatically unsaturated bond from components (C) plus (D) is present per silicon-bonded hydrogen in component (B). On the other hand, when at least 1 aliphatically unsaturated bond from components (C) plus (D) is present per silicon-bonded hydrogen in component (B), the organopolysiloxane product will contain the epoxy-containing organic group and alkoxysilylalkyl but will be substantially free of silicon-bonded hydrogen.

The reaction sequence in the preparative method according to the present invention is arbitrary, and the following are provided, inter alia, as examples of the reaction sequence:

(a) component (A) is first mixed with component (B); component (C) is then added to the resulting system to yield SiH-containing organopolysiloxane that carries epoxy-containing organic groups; component (D) is subsequently added to the system to yield alkoxysilylalkyl-containing organopolysiloxane that carries epoxy-containing organic groups;

(b) component (A) is first mixed with component (B); component (D) is then added to the resulting system to yield SiH-containing, alkoxysilylalkyl-containing organopolysiloxane; component (C) is subsequently added to the system to yield alkoxysilylalkyl-containing organopolysiloxane that carries epoxy-containing organic groups.

The reaction temperature is not specifically restricted in the preparative method according to the present invention; however, the reaction temperature preferably falls within the range of 50° to 150° C. in order to rapidly complete the addition reaction. Organic solvent can be used in the preparative method according to the present invention. Organic solvents usable by the present invention are specifically exemplified by aromatic solvents such as toluene and xylene; aliphatic solvents such as hexane, heptane, and octane; and ketone solvents such as acetone and methyl ethyl ketone. The invention organopolysiloxane prepared as described above is obtained as a reaction mixture, and it can be purified by distillation of unreacted components (C) and (D) from the product mixture.

Because the organopolysiloxane according to the present invention carries epoxy-containing organic groups, it is useful as a physical-property modifier or plasticizer for thermosetting resin compositions based on imide resins, phenolic resins, and epoxy resins, and for thermoplastic resins such as acrylic resins and polyethylene resins. In particular, when the organopolysiloxane according to the present invention is a low-viscosity liquid at room temperature, it is useful as a reactive diluent for organic resins. Organopolysiloxane according to the present invention that contains both epoxy-containing organic groups and alkoxysilylalkyl is useful as an adhesion promoter for curable organopolysiloxane compositions and organic resin coatings and as a starting material for adhesive primer compositions.

The present invention will be explained in greater detail below using illustrative examples. The viscosity in the examples is the value measured at 25° C. and parts are by weight. The development of the reactions was monitored by infrared spectroscopic analysis.

EXAMPLE 1

50 Parts of organopolysiloxane (boiling point, 188° C.; molecular weight, 328.7) with the following formula,

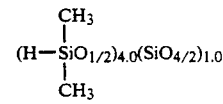

84 parts allyl glycidyl ether, and 200 weight toluene were placed in a 1 L four-neck flask equipped with stirrer, reflux condenser, and thermometer. The water fraction in the system was then azeotropically removed by heating while stirring. After cooling, approximately 10 drops of 2 wt % chloroplatinic acid in isopropanol were dripped into the system, which was then reheated and held at the reflux temperature of toluene for 3 hours with stirring. At this point the absence of silicon-bonded hydrogen in a sample of the reaction mixture was confirmed by infrared spectroscopic analysis. The unreacted allyl glycidyl ether and the toluene were distilled off in vacuo to afford 117.4 parts of a yellowish brown, transparent liquid product. This product had a viscosity of 0.054 Pa.s (Pascal.seconds) and an epoxy equivalent weight of 198 g/eq. The results of nuclear magnetic resonance spectroscopic analysis confirmed this product to be organopolysiloxane with the following formula.

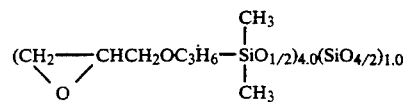

EXAMPLE 2

100 Parts organopolysiloxane (viscosity=0.105 Pa.s, silicon-bonded hydrogen content=0.40 weight %) with the following formula,

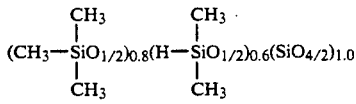

$$(CH_3-SiO_{1/2})_{0.8}(H-SiO_{1/2})_{0.6}(SiO_{4/2})_{1.0}$$
with CH₃ groups on the silicons as shown.

54.2 parts allyl glycidyl ether, and 41.6 parts toluene were placed in a 1 L four-neck flask equipped with stirrer, reflux condenser, and thermometer. The water fraction in the system was then azeotropically removed by heating while stirring. After cooling, approximately 10 drops of 2 wt % chloroplatinic acid in isopropanol were dripped into the system, which was then reheated and held at the reflux temperature of toluene for 3 hours with stirring. At this point the absence of silicon-bonded hydrogen in a sample of the reaction mixture was confirmed by infrared spectroscopic analysis. The unreacted allyl glycidyl ether and the toluene were distilled off in vacuo to afford 140 parts of a brown, transparent liquid product. This product had a viscosity of 0.520 Pa.s and an epoxy equivalent weight of 420 g/eq. The results of nuclear magnetic resonance spectroscopic analysis confirmed this product to be organopolysiloxane with the following formula

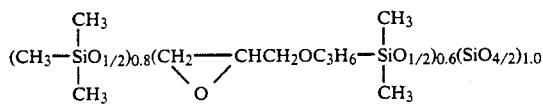

$$(CH_3-SiO_{1/2})_{0.8}(CH_2\overset{O}{\overline{\diagdown\diagup}}CHCH_2OC_3H_6-SiO_{1/2})_{0.6}(SiO_{4/2})_{1.0}$$

EXAMPLE 3

25 Parts organopolysiloxane (viscosity=0.046 Pa.s, silicon-bonded hydrogen content=0.913 weight %) with the following formula,

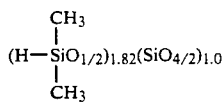

$$(H-SiO_{1/2})_{1.82}(SiO_{4/2})_{1.0}$$

13 parts 1,2-epoxy-4-vinylcyclohexane, 13 parts allyltrimethoxysilane, and 10.3 parts toluene were placed in a 300 mL four-neck flask equipped with stirrer, reflux condenser, and thermometer. The water fraction in the system was then azeotropically removed by heating while stirring. After cooling, approximately 10 drops of 2 wt % chloroplatinic acid in isopropanol were dripped into the system, which was then reheated and held at the reflux temperature of toluene for 3 hours with stirring. The unreacted 1,2-epoxy-4-vinylcyclohexane and allyltrimethoxysilane and the toluene were subsequently distilled off in vacuo to afford 48.8 parts of a brown, transparent liquid product. This product had a viscosity of 1.55 Pa.s. The absorptions characteristic of the epoxy group, methoxy group, and silicon-bonded hydrogen atom were confirmed for this product by infrared absorption spectroscopic analysis. The results of nuclear magnetic resonance spectroscopic analysis confirmed this product to be organopolysiloxane with the following formula

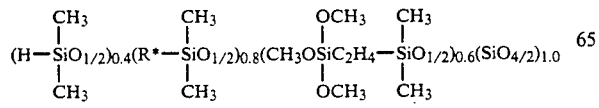

$$(H-SiO_{1/2})_{0.4}(R^*-SiO_{1/2})_{0.8}(CH_3OSiC_2H_4-SiO_{1/2})_{0.6}(SiO_{4/2})_{1.0}$$

where R* is 2-(3,4-epoxycyclohexyl)ethyl.

Effects of the Invention

The organopolysiloxane according to the present invention is a novel organopolysiloxane that is composed of monofunctional and tetrafunctional siloxane units and that contains an epoxy-containing organic group. The preparative method according to the present invention is characterized by its ability to produce this novel organopolysiloxane.

I claim:

1. A method for producing an organopolysiloxane having an epoxy-containing organic group comprising reacting in the presence of
   (A) a hydrosilylation-reaction catalyst, with
   (B) an SiH-containing organopolysiloxane with the general formula

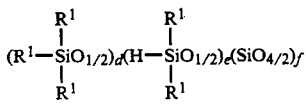

$$(R^1-SiO_{1/2})_d(H-SiO_{1/2})_e(SiO_{4/2})_f$$

$R^1$ is a non-alkenyl monovalent hydrocarbon group, d is 0 or a positive number, e and f are positive numbers, d/f has a value of 0 to 4, e/f has a value of 0.05 to 4, and (d+e)/f has a value of 0.2 to 4, (C) an aliphatically unsaturated epoxy-containing organic compound, and optionally
   (D) an alkoxysilylalkene, where the moles of aliphatic unsaturation in (C) and (D) is less than the moles of silicon-bonded hydrogen atoms in (B).

2. The method according to claim 1 in which (A) is first mixed with (B), (C) is then added, and (D) is subsequently added.

3. The method according to claim 1 in which (A) is first mixed with (B), (D) is then added, and (C) is subsequently added.

4. The method according to claim 1 in which (A) is first mixed with (B), (D) is then added, and (C) is subsequently added.

5. A composition obtained according to the method of claim 1 comprising an organopolysiloxane having an epoxy-containing organic group wherein said organopolysiloxane has the following units

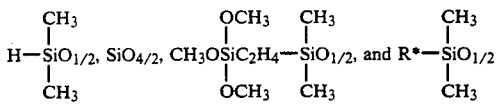

$$H-SiO_{1/2}\text{ (with }CH_3\text{)},\ SiO_{4/2},\ CH_3OSiC_2H_4-SiO_{1/2}\text{ (with }OCH_3\text{)},\ \text{and}\ R^*-SiO_{1/2}\text{ (with }CH_3\text{)}$$

where R* is 2-(3,4-epoxycyclohexyl)ethyl.

6. A method for producing an organopolysiloxane having an epoxy-containing organic group comprising reacting in the presence of
   (A) a hydrosilylation-reaction catalyst, with
   (B) an SiH-containing organopolysiloxane with the general formula

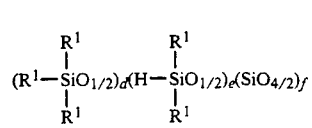

$$(R^1-SiO_{1/2})_d(H-SiO_{1/2})_e(SiO_{4/2})_f$$

$R^1$ is a non-alkenyl monovalent hydrocarbon group, d is 0 or a positive number, e and f are positive numbers, d/f has a value of 0 to 4, e/f has a value of 0.05 to 4, and (d+e)/f has a value of 0.2 to 4,
(C) an aliphatically unsaturated epoxy-containing organic compound, and optionally
(D) an alkoxysilylalkene, where (A) is first mixed with (B), (C) is then added and (D) is subsequently added, and where the moles of aliphatic unsaturation in (C) and (D) is equal to or more than the moles of silicon-bonded hydrogen atoms in (B).

7. A method for producing an organopolysiloxane having an epoxy-containing organic group comprising reacting in the presence of
(A) a hydrosilylation-reaction catalyst and an organic solvent, with
(B) an SiH-containing organopolysiloxane with the general formula

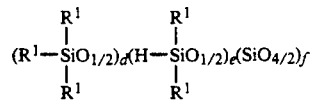

$R^1$ is a non-alkenyl monovalent hydrocarbon group, d is 0 or a positive number, e and f are positive numbers, d/f has a value of 0 to 4, e/f has a value of 0.05 to 4, and (d+e)/f has a value of 0.2 to 4, (C) an aliphatically unsaturated epoxy-containing organic compound, and optionally
(D) an alkoxysilylalkene where the moles of aliphatic unsaturation in (C) is less than the moles of silicon-bonded hydrogen atoms in (B).

* * * * *